United States Patent Office 3,137,758
Patented June 16, 1964

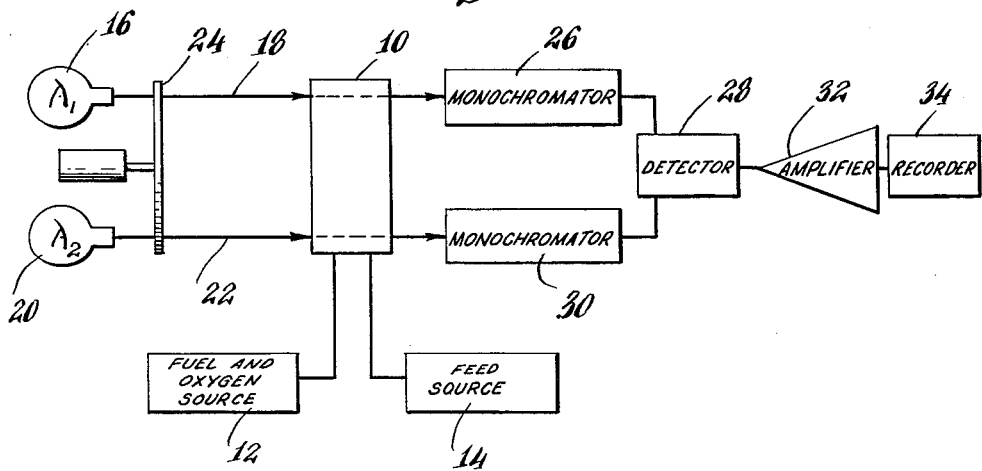
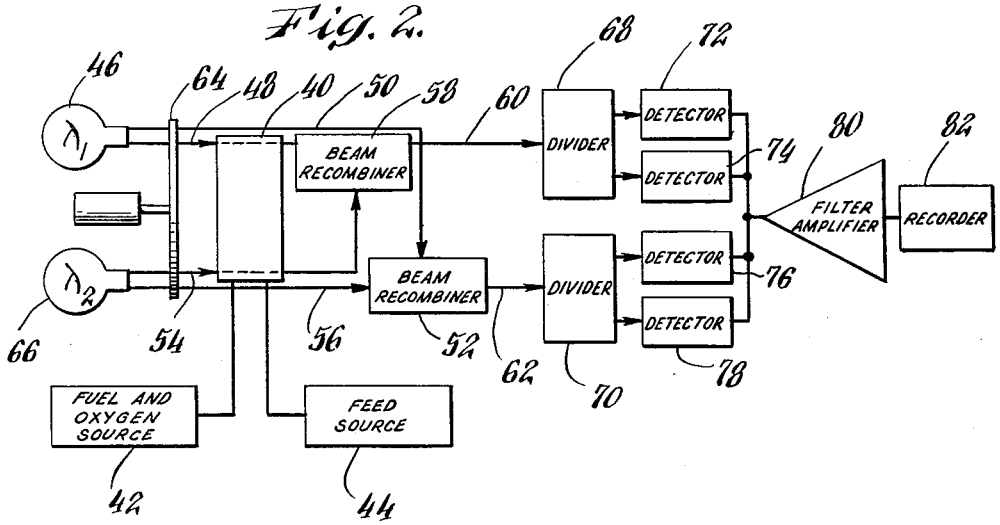

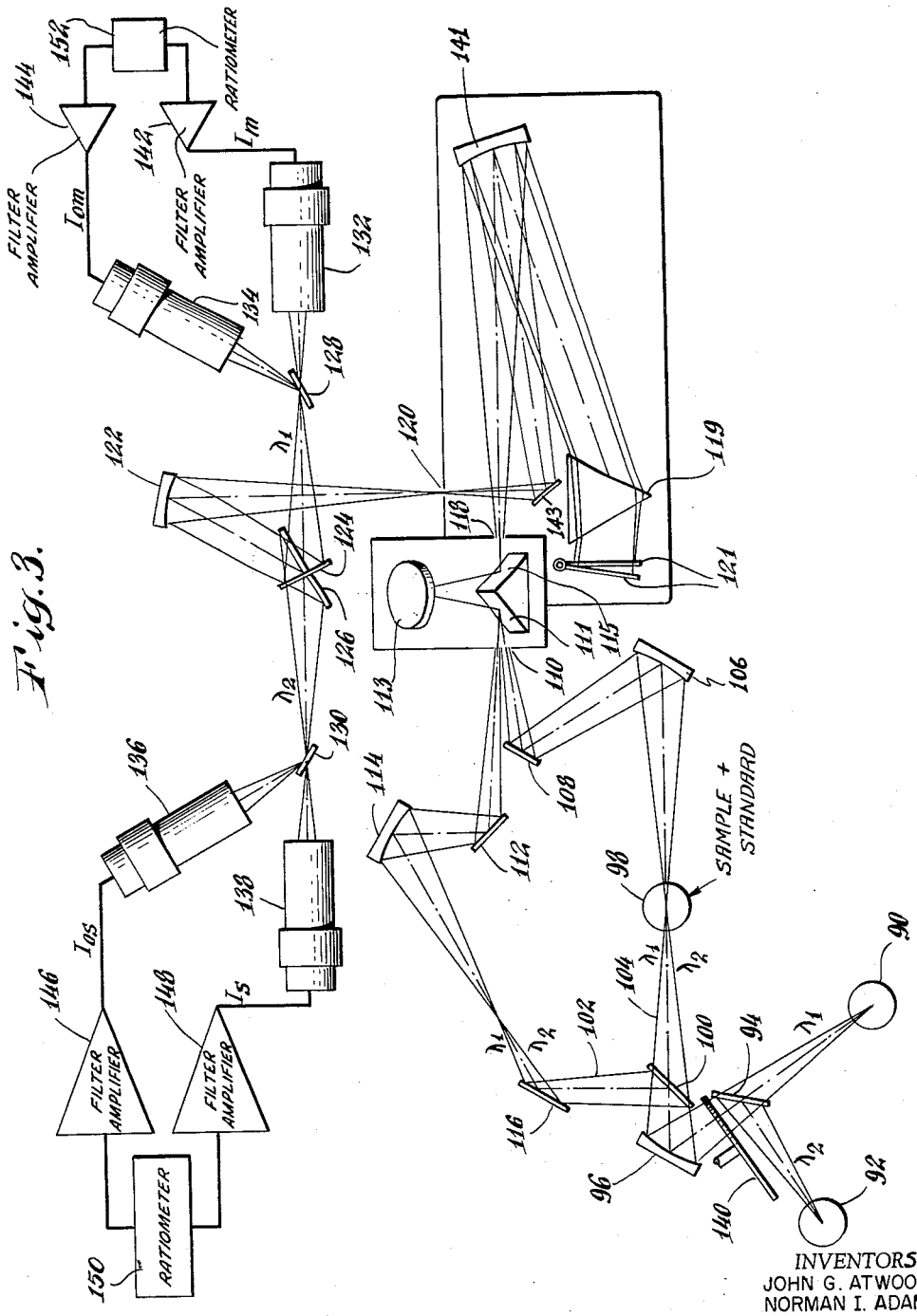

3,137,758
APPARATUS FOR SPECTROCHEMICAL ANALYSIS BY THE INTERNAL STANDARD METHOD
William B. Mason, Rochester, N.Y., and Norman I. Adams III, Wilton, and John G. Atwood, West Redding, Conn., assignors to The Perkin-Elmer Corporation, Norwalk, Conn., a corporation of New York
Filed Mar. 16, 1960, Ser. No. 15,460
3 Claims. (Cl. 88—14)

This invention relates to apparatus for spectrochemical analysis and, more especially, to an internal standard method for atomic absorption analysis.

U.S. Patent 2,847,899, issued August 19, 1958, to A. Walsh, discloses an improved method of analysis of sample substances for elements and their isotopes. The Walsh method may be denominated "atomic absorption." The salient principle employed is that an atomic vapor absorbs radiation at certain relatively specific wavelengths dependent upon the elements or isotopes in the vapor. The Walsh patent discloses the use of a flame for producing the atomic vapor, a solution of the sample substance being sprayed into the flame. Other means of atomizing may also be employed. Radiation containing a spectral line of the element being investigated is passed through the flame and the absorption of radiation at the particular wavelength is measured as an indication of the amount of the atomized element.

This method is a basic advance in elemental analysis. It provides a way of analyzing for many elements heretofore difficult to isolate and is particularly well suited as a complement to flame photometry. However, it is somewhat difficult to control such variables as sample feed rate, and the relative fraction of the sample that passes through the beam of radiation in a free atomic state. The latter variable is affected by such factors as flame size and gas flow.

It is, therefore, the primary object of the present invention to improve the usefulness of the atomic absorption technique of spectrochemical analysis.

The above object is attained by a method of determining the concentration of an element or an isotope in a sample substance which comprises mixing the sample with a standardizing substance. The mixture is formed into an atomic vapor containing a second element or isotope. Radiation containing a first spectral line characteristic of the sample element or isotope and a second spectral line characteristic of the second element or isotope is passed through the vapor. The emergent radiation is then measured at each of the two spectral lines.

The apparatus of the invention will be more apparent from the following description, appended claims, and the figures of the attached drawings wherein:

FIG. 1 is a schematic block diagram of a single beam atomic absorption instrument embodying the method of the present invention;

FIG. 2 is a schematic block diagram of a double beam atomic absorption instrument embodying the method of the present invention;

FIG. 3 is a partially schematic diagram of an instrument usable with the present invention showing the optical system layout in schematic form.

Figure 4:
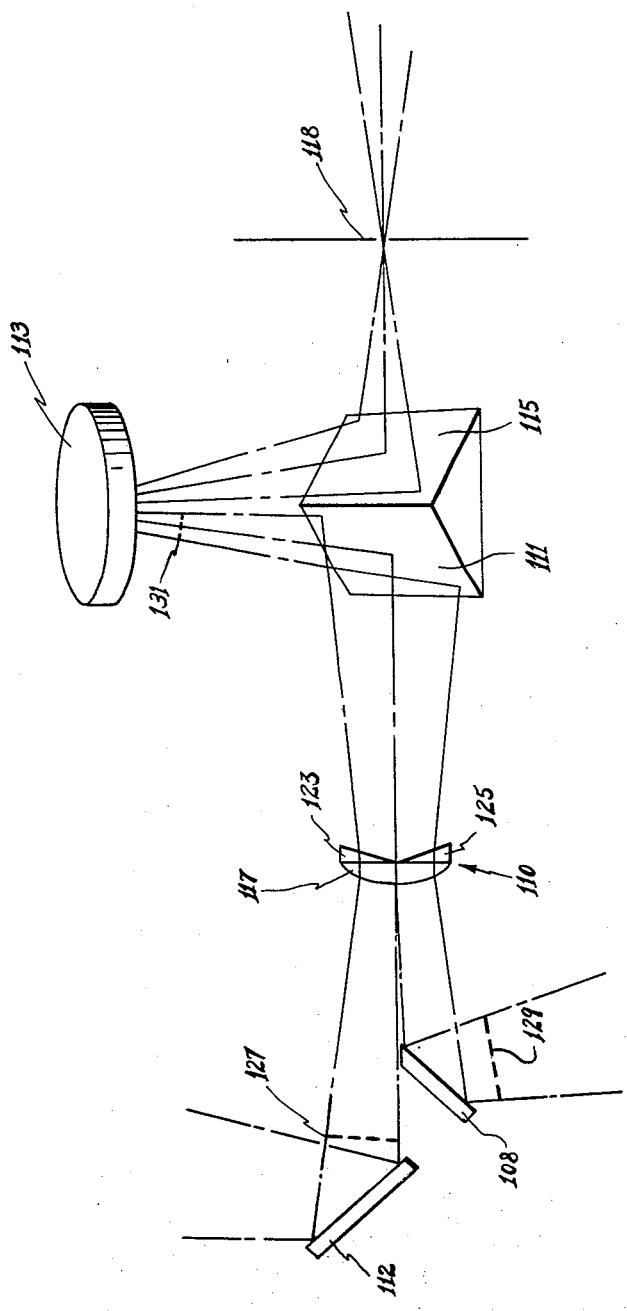
FIG. 4 is an enlarged detail of a portion of FIG. 3.

In accordance with this invention, many of the variables introduced in converting a sample to an atomic vapor may be compensated for by use of the "internal standardizing" technique. These variables are most pronounced when a flame is used as the atomizer. It will be apparent that, due to the inherent instability of a flame, the path length of radiation through a sample introduced into the flame will be variable. Furthermore, variation in the rate at which the sample flows into the flame will cause variations in the measured concentration.

The liquid or gaseous sample to be tested is mixed with a known amount of a standard fluid. The standard is selected so that, upon atomization, it will contribute a known concentration of an element or isotope having a spectral absorption line different from that of the element or isotope to be measured. Radiation containing both absorption lines is passed through the atomized vapor and the energy absorption at each frequency is measured. If the standardizing element is thoroughly mixed with the measured element, absorption discrepancies due to variation in sample flow rate and in "sample cell" (flame) thickness will be reflected in absorption at the standardizing frequency. Consequently, a more accurate analysis may be obtained by corresponding adjustment of the measured values, either automatically or by calculation.

FIG. 1 is a schematic illustration of a single beam atomic absorption instrument adapted for use with the internal standard technique. A flame 10 supplied with fuel and oxygen from a suitable source 12 is employed to form the atomic vapor. A feed source 14 provides a mixture of a sample solution and a standardizing solution which is vaporized in the flame. A suitable line emission source 16 provides a radiation beam 18 of wavelength $\lambda_1$ selected to be absorbed by the atomic vapor of the element to be analyzed. A second line emission source 20 provides a radiation beam 22 selected to be absorbed by the atomic vapor of the standardizing element. The beams are chopped prior to their entrance into the flame by a suitable chopper 24 to distinguish them from radiation emitted by the flame. Beam 18 enters a monochromator 26 designed to filter out all wavelengths except $\lambda_1$, which is then passed to a detector 28. Similarly, beam 22 passes into monochromator 30 which allows only radiation of wavelength $\lambda_2$ to pass to detector 28. The output of the detector is then amplified in amplifier 32 and recorded by recorder 34. The recorder indicates the ratio of the absorbance at $\lambda_1$ to the absorbance at $\lambda_2$ and is thus proportional to the ratio of concentration between the two elements.

The use of the internal standard technique in the single beam mode of atomic absorption as illustrated in FIG. 1 reduces the dependence of the measurement on the stability of atomic density, atomic distribution within the flame, and sample feed rate. However, the output will be seen to depend directly on the source intensities and the relative sensitivity of the detector to each of wavelengths $\lambda_1$ and $\lambda_2$. In order to effectively eliminate dependence on the latter factors, the double beam method utilizing the internal standard technique may be employed as illustrated in FIG. 2.

In FIG. 2, the flame 40 is supplied with fuel and oxygen from source 42 and with the sample-standard mixture from feed source 44. In this embodiment, line emission source 46 provides two beams of wavelength $\lambda_1$. Beam 48 passes through flame 40. Beam 50 is a reference beam that passes around flame 40 to a beam recombiner 52. Another line emission source 66 emits two beams of wavelength $\lambda_2$. Beam 54 passes through flame 40. Beam 56 is a second reference beam that passes around flame 40 to beam recombiner 52. Chopper 64 chops the radiation emitted by sources 46 and 66 so as to differentiate this radiation from the background emission of flame 40. Beams 48 and 54 that have passed through flame 40 are passed to a sample beam recombiner 58. The combined "sample" beam 60 and "reference" beam 62 enter wavelength dividers 68 and 70. The resulting four beams strike detectors 72, 74, 76 and 78. The detector signals are passed to an amplifier and filter network 80 and are properly combined for meter or recorder 82. The measuring circuits of this embodiment are designed so as to respond to (1) the ratio of the $\lambda_1$ flame signal to the $\lambda_1$ reference signal which is proportional to the absorbence of $\lambda_1$ wavelength radiation by the atomic vapor; (2) the corresponding $\lambda_2$ ratio which is proportional to the absorbence of $\lambda_2$ radiation; and (3) the ratio of $\lambda_1$ absorbence to $\lambda_2$ absorbence which provides the ratio of concentration of one element to another. From such a ratio, knowing the amount of standard solution added, the amount of measured component may easily be calculated.

FIG. 3 illustrates more specifically an instrument embodying this invention. The optical layout is specially designed so that the instrument is easily convertible to operation in any of four modes: (1) single beam without internal standard; (2) double beam without internal standard; (3) single beam with internal standard; (4) double beam with internal standard. The latter mode is the one described.

A first line emission source 90 is provided for the purpose of radiating energy at a wavelength which may be denominated $\lambda_1$. This wavelength is selected to be absorbed by an atomic vapor of the element being investigated. Source 90 will most commonly be either a flame having a solution of the element injected into it or a lamp source, such as a hollow cathode lamp containing the element. It should be understood, however, that the invention is not limited to any one type of source but is equally adapted to use with any suitable emitter.

A second line emission source 92 radiates energy at a wavelength of $\lambda_2$. This wavelength is selected to be absorbed by an atomic vapor of an element selected as a standard. The type of source employed for $\lambda_2$ is no more critical than that for $\lambda_1$. Also, source 90 may be of one type and source 92 another.

A beam combining mirror 94 is positioned to intercept the $\lambda_2$ beam from source 92 and redirect it to a toroidal mirror 96 which forms a horizontal slit image of combined wavelengths $\lambda_1$ and $\lambda_2$ within vaporizing flame 98. In the illustrated embodiment, mirror 94 is approximately one-half the height of the beam between it and toroid 96. The beam of wavelength $\lambda_1$ from source 90 will pass over mirror 94. At flame 98, the toroid will have focused both wavelengths to the same image.

Between toroid 96 and flame 98 is a beam-splitting mirror 100 which forms a "reference" beam 102 composed of wavelengths $\lambda_1$ and $\lambda_2$ and similar to "sample" beam 104. Beam splitter 100 as illustrated is a half-silvered mirror although the invention is not limited to this one type.

A refocusing toroid 106 is provided in the sample beam emanating from flame 98. In combination with plane mirror 108, toroid 106 forms a horizontal slit image containing wavelengths $\lambda_1$ and $\lambda_2$ at a location 110. Similarly, the reference beam contains plane mirrors 112 and 116 and refocusing toroid 114 similar to toroid 106. This combination of elements forms a reference slit image containing wavelengths $\lambda_1$ and $\lambda_2$ alongside the sample slit image. The resultant image at location 110 is a horizontal slit image, one end formed by the reference beam, the other by the sample beam. Each end contains both $\lambda_1$ and $\lambda_2$.

Referring to FIG. 4, it will be seen that a novel lens-wedge unit is positioned at the horizontal slit image location 110. This unit consists of a plano-convex focusing lens 117 with similar optical wedges 123 and 125 cemented to its plane surface. In order to achieve effective four-beam operation while using a standard bichromator, it is necessary that the two pupil images positioned at location 127 and 129 which are also images of Littrow mirror 121 be repositioned in front of a concave refocusing mirror 113 and these two images should also be coincident. Lens 117 focuses each point of each pupil image 127 and 129 to a point at a second pupil image location 131 located between plane mirror 111 and refocusing mirror 113. The wedges 123 and 125 then cause these images to become coincident. Plane mirror 115 then redirects the radiation to bichromator entrance slit 118. In order to provide a 90° rotation of the slit image between location 110 and slit 118, the combination of plane mirrors 111 and 115 and focusing mirror 113 is rotated to lie in a plane making a 45° angle with the plane of the paper. As a consequence, the horizontal slit image becomes vertical at slit 118.

The function of the bichromator is to filter out those wavelengths not falling within a region near each of $\lambda_1$ and $\lambda_2$. Two monochromators or a suitable filter system could also be used. In the illustrated embodiment, the bichromator comprises a standard monochromator having a collimator 141, a prism 119 with a split Littrow mirror 121, and a plane mirror 143. Each half of the Littrow is separately controlled. The beam leaving exit slit 120 of the bichromator impinges upon yet another toroidal focusing mirror 122. This mirror forms a separate image of each half of the split Littrow mirror 121, thus wavelengths $\lambda_1$ and $\lambda_2$ are separated at such an image point. Plane mirror 124 is positioned at the image of the $\lambda_1$ Littrow and plane mirror 126 is positioned at the image of the $\lambda_2$ Littrow.

Each wavelength is then separated into its component reference and sample portions. This is accomplished by forming an image of the bichromator entrance slit 118 at each of plane mirrors 128 and 130. Since this image is vertically divided into reference and sample sections, mirrors 128 and 130 are each positioned to interrupt and redirect only one-half of the impinging beam. In the illustration, the redirected beam in each case is the reference portion. Each of the four beams then actuates a detector 132, 134, 136, and 138. It will now be seen that detector 134 will produce a signal proportional to the intensity of the reference beam of wavelength $\lambda_1$. Detector 132 will have an output proportional to the intensity of the sample beam of wavelength $\lambda_1$ leaving the sample flame. Detector 138 will have an output proportional to the sample beam of wavelength $\lambda_2$ leaving the sample flame, and the output of detector 136 will be proportional to the intensity of the reference beam of wavelength $\lambda_2$. It will be noted that the sample beams of both wavelengths may contain components and noise due to radiation from the sample flame. These unwanted components may be most easily removed by chopping the source radiation by a suitable chopper 140. The pulsating output of each detector may then be readily distinguished from the unwanted background.

It is to be noted that in applicants' invention, it is not necessary to chop the various beams out of phase with one another as is disclosed, for example, in the Walsh patent. Rather, applicants have embodied in their invention the novel feature of simultaneously chopping all four beams, both reference and sample at each wavelength. This is accomplished in the embodiment of FIGURE 3 by positioning chopper 140 at a point where all four beams are combined. By simultaneously chopping the reference and sample beams, rapid fluctuations in each which are caused by source brightness fluctuations are caused to vary together rather than incoherently. These fluctuations may thus be balanced against one another and their effects thereby cancelled. It is to be noted that simultaneous chopping of reference and sample beams is not limited to use with the internal standard method nor even to atomic absorption. This novel technique may be of great value in other forms of spectrometry, and it is not limited to use with any particular number of radiation beams.

It should also be noted that unexpected advantages originate from applicants' use of a beam splitter to form the reference and sample beams. By means of this technique, the two beams are caused to originate from the same spatial region of the source. This is of particular importance when utilizing flame sources as flames have spatial, as well as temporal, fluctuations.

It should also be noted that the novel feature of applicants' invention which comprises forming separate images of the Littrow mirror, and the slits should not be considered limited to internal standardization or to atomic absorption.

In order to describe a sample measurement, it is assumed that $\lambda_1$ is wavelength absorbed by the element to be measured. The intensity of the reference beam of wavelength $\lambda_1$, that which is bypassed around flame 98, may be denominated $I_{om}$. The intensity of the $\lambda_1$ beam that has passed through flame 98 is $I_m$. Similarly, the beams of "standardizing" wavelength $\lambda_2$ may be called $I_{os}$ and $I_s$. The output of detector 134 is then proportional to $I_{om}$, that of detector 132 to $I_m$, that of detector 138 to $I_s$, and that of detector 136 to $I_{os}$. Each of these outputs goes to a suitable filter-amplifier circuit 142, 144, 146, 148 where only the A.C. component of the signals resulting from the action of the chopper 140 is retained and amplified. In this manner, stray light and emission from flame 98 are effectively cancelled.

In determining the concentration of the measured element in the atomic vapor, it is next necessary to determine the ratios $$\frac{I_s}{I_{os}} \text{ and } \frac{I_m}{I_{om}}$$

These may be calculated from the measured output of each amplifier or they may be automatically measured by feeding the amplifier outputs to ratiometers 150, 152, which give the desired ratios as outputs. Each of these ratios is proportional to $e^{kcl}$ where $k$ is a constant determined by the properties of the measured element or the standard element, as the case may be, $c$ is the concentration of measured or standard element atoms in the radiation beam, and $l$ is the length of the radiation path in the region of the measured or standard element atoms. The logarithm of each ratio may then be calculated to obtain the value $kcl$ for each wavelength and the ratio $$\frac{k_1 c_1 l_1}{k_2 c_2 l_2}$$

may then be found. It may then be assumed that the ratio $l_1:l_2$ is fixed, approximately at unity, and that the ratio $k_1:k_2$ is fixed by nature. The ratio of $k_1 l_1 : k_2 l_2$ may be calculated from a calibration run using a known ratio of $c_1:c_2$. From this ratio, $c_1/c_2$ may be easily ascertained. As $c_2$, the concentration of the standardizing element in the solution, is known, $c_1$ may be found.

It will be understood that these calculations may be carried out by computers or other circuitry as well as by mental calculations. It will also be understood that the desired concentration of measured element atoms may be calculated with equal facility when operating in the two-beam mode, without a reference beam. This type of operation is shown in FIGURE 1 and may be achieved in the embodiment of FIGURE 3 by removing mirror 100.

One of the advantages of simultaneous chopping at both wavelengths is that it is then possible to employ the signals from the measurements at one wavelength to correct the measurements obtained at the other wavelength. In this way, changes in absorbance at the second wavelength caused by effects other than concentration ratio changes can be at least partially compensated instantaneously.

Another way of utilizing the internal standard technique is to employ the standardizing element as an emitter. With this type of analysis, only a single wavelength source is required. The second wavelength is emitted by the cloud of atomized standardizing element.

Another method of operation falling within the scope of this invention comprises the use of a sample element as an emitter and the use of an atomized standard element as a radiation absorber. This might be of particular advantage, for example, in certain biological researches where a sample may contain a known amount of a good radiation absorbing element and an unknown amount of an investigated element having particularly good emitting qualities. Other applications will be apparent to those skilled in the art.

It is to be understood that, although the invention has been described with respect to a specific embodiment, it is not to be construed as so limited. For example, the invention is not limited to the use of any particular kind of source, optics, or atomic vaporizing apparatus. Neither is this invention limited to the use of a particular type of bichromator, monochromator, or filter. For example, gratings could be used in place of the prism illustrated.

It will also be apparent that the unit made up of lens 117 and wedges 123 and 125 is capable of many variations. Lens 117, for example, may be replaced by any focusing element such as a mirror. The wedges may differ from one another and, in fact, a single wedge could be employed. Also, the units need not be in physical conjunction.

This invention is to be construed as limited only by the scope of the following claims.

We claim:
1. Apparatus for spectroscopic analysis which comprises first radiation source means adapted to emit first wavelength radiation; second radiation source means adapted to emit second wavelength radiation; means for combining radiation from said first and second source means to provide a combined beam containing said first and second wavelengths; means for periodically chopping said combined beam; beam splitting means in the combined beam to provide similar reference and sample beams; means for passing the sample beam through a sample area; means adapted to form a slit image of the sample and reference beams, one end of the slit image being formed by the sample beam, the other end being formed by the reference beam; split Littrow bichromator means adapted to receive at its entrance slit the radiation from said slit image and produce at its exit slit an image containing only first and second wavelength radiation; means adapted to receive the beam of radiation emanating from said exit slit and form therein the image of said split Littrow mirror at a first location and the image of the bichromator entrance slit at a second location; first reflecting means at said first location adapted to receive the image of one portion of said split Littrow mirror and direct first wavelength radiation in a first direction; second reflecting means at said first location adapted to receive the image of the other portion of said split Littrow mirror and direct second wavelength radiation in a second direction; first radiation divider means in said first wavelength radiation at said second location to divide the first wavelength beam into sample and reference portions; second radiation divider means in said second wavelength radiation at said second location to divide the second wavelength beam into sample and reference portions; and means adapted to measure the intensity of the intermittent radiation of the reference and sample portion of each of the first and second wavelength beams.

2. Apparatus for spectroscopic analysis which comprises first radiation source means adapted to emit first wavelength radiation; second radiation source means adapted to emit second wavelength radiation; means for combining radiation from said first and second source means to provide a combined beam containing said first and second wavelengths; means for periodically chopping said combined beam; beam splitting means in the combined beam to provide similar reference and sample beams; means for passing the sample beam through a sample area; means adapted to form a horizontal slit image of the sample and reference beams, one end of the slit image being formed by the sample beam, the other end being formed by the reference beam; image rotation means to rotate the slit image from horizontal to vertical; split Littrow bichromator means adapted to receive at its entrance slit the radiation from the vertical slit image and produce at its exit slit an image containing only first and second wavelength radiation; means adapted to receive the beam of radiation emanating from said exit slit and form therein the image of said split Littrow mirror at a first location and the image of the bichromator entrance slit at a second location; first reflecting means at said first location adapted to receive the image of one portion of said split Littrow mirror and direct first wavelength radiation in a first direction; second reflecting means at said first location adapted to receive the image of the other portion of said split Littrow mirror and direct second wavelength radiation in a second direction; first radiation divider means in said first wavelength radiation at said second location to divide the first wavelength beam into sample and reference portions; second radiation divider means in said second wavelength radiation at said second location to divide the second wavelength beam into sample and reference portions; and means adapted to measure the intensity of the intermittent radiation of the reference and sample portion of each of the first and second wavelength beams.

3. The apparatus of claim 2 wherein said image rotation means includes lens means adapted to receive radiation from said horizontal slit image and reimage each end thereof in a substantially common plane; and optical wedge means adapted to reposition the images so formed to a common location.

References Cited in the file of this patent

UNITED STATES PATENTS

| | | |
|---|---|---|
| 2,585,901 | Dieke | Feb. 19, 1952 |
| 2,601,327 | Rose | June 24, 1952 |
| 2,679,184 | Atwood | May 25, 1954 |
| 2,679,185 | Atwood | May 25, 1954 |
| 2,737,591 | Wright et al. | Mar. 6, 1956 |
| 2,803,752 | Warren | Aug. 20, 1957 |
| 2,811,891 | Roddy | Nov. 5, 1957 |
| 2,847,899 | Walsh | Aug. 19, 1958 |
| 2,856,811 | Kaye | Oct. 21, 1958 |